3,303,525
PIPELINE PIG RETRIEVER
Claude M. Peoples, Edward A. Hurst, and James H. Martin, Jr., Baytown, Tex., assignors, by mesne assignments, to Esso Research and Engineering Company, Elizabeth, N.J., a corporation of Delaware
Filed Oct. 14, 1963, Ser. No. 315,838
12 Claims. (Cl. 15—104.06)

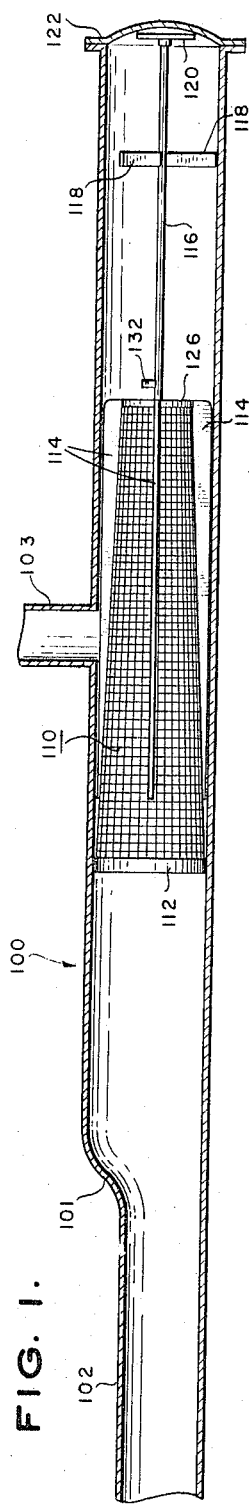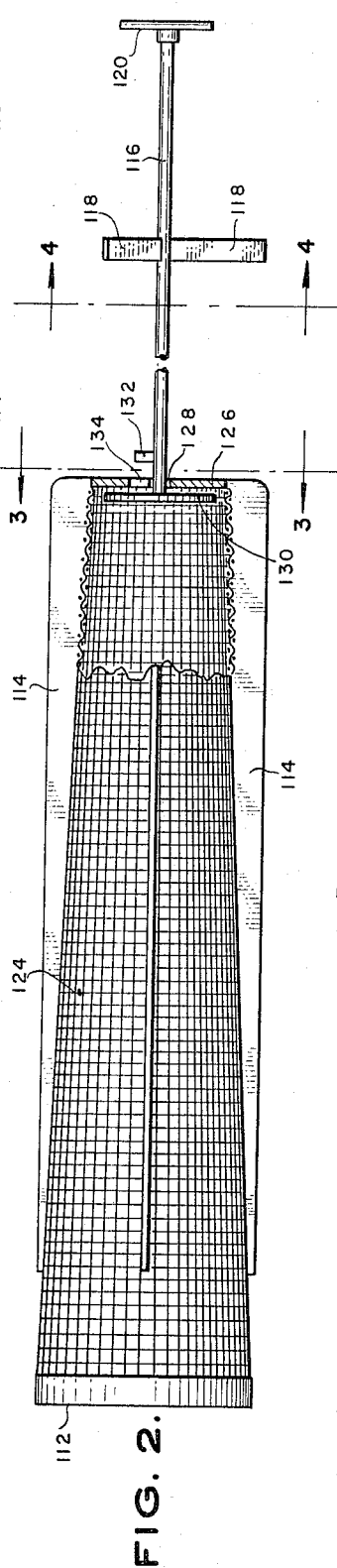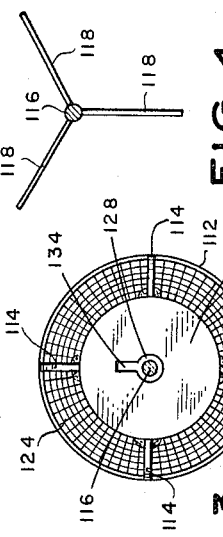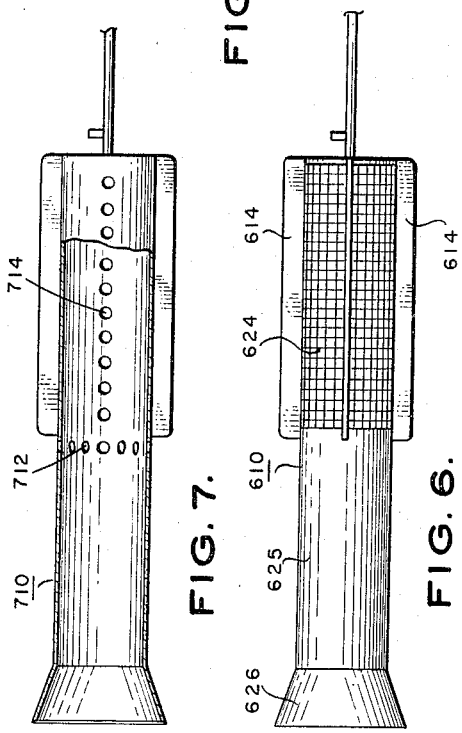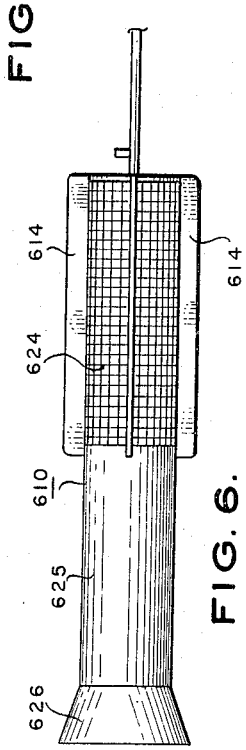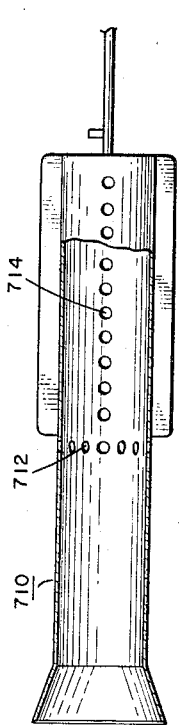
INVENTORS.
CLAUDE M. PEOPLES,
EDWARD A. HURST,
JAMES H. MARTIN, JR.,
BY Sylvester H. Brock, Jr.
ATTORNEY.

The present invention relates to an apparatus for retrieving pipeline pigs. More particularly, the present invention relates to a receiver for foamed plastic pipeline pigs, which comprises a frustoconical foraminous basket which may be positioned within an enlarged section of a pipeline run for catching and retaining a foamed plastic pig which has been passed through the pipeline.

During pipeline pigging operations, a number of pigs have been used. A pig trap, generally constituting an enlarged portion of the pipeline with a draw-off line normal to the line of flow of the enlarged portion, has been widely used.

Some pigs, such as those fabricated from foamed plastic, have a tendency to deform to a great extent such that even though the draw-off line is smaller than the diameter of the pipeline run or of the foamed plastic pig, the pig may be deformed into a configuration conforming with the outlet opening to effectively block further flow through the pipeline section which contains the pig trap. Unless effectively taken into account during the design of the pig trap, a foamed plastic pig may also deform or compress to an extent sufficient to allow it to flow into and through the draw-off line, thus escaping from the pig trap. This may happen even though the draw-off line is several pipe sizes smaller than the external diameter of the foamed pig.

In the prior art pig traps, the lessening of the rate of flow through the enlarged portion was relied upon to allow the foamed pig to settle to the bottom of the trap, whence it may be withdrawn upon isolating the trap from the flowing stream. However, as pointed out above, this has not been satisfactory in that the draw-off line can be blocked by the pig, thereby stopping the flow of fluid through the pipeline.

The present invention effectively and dependably avoids this problem by providing a frustoconical member including basket means so positioned in the pig trap the deformable pig is forced into a foraminous basket and is compressed to an extent which allows the free flow of fluid around the trapped pig and into the draw-off line.

The foraminous basket comprises a basket formed into the shape of a frustum of a cone and fabricated of wire mesh or perforated sheet metal or a cylindrical basket with an imperforate frustoconical inlet. The larger end of the cone in either case is essentially the same diameter as the inside of the pig trap, while the smaller end is considerably smaller than the inside diameter of the pig trap, being from one-half to three-fourths the diameter of the larger end. The smaller end is provided with a metal plate which serves as a means of retaining the pig inside the basket, if the pig should be forced that far into the basket, and also serves as a point to attach a positioning and ejecting device. The basket is preferably from three and one-half to five diameters long, relative to the inside diameter of the pig trap. This is to accommodate two pigs within the receiver. The pigs are ordinarily about one and one-half diameters in length.

Ordinarily, the inlet end of the frustoconical basket is positioned immediately upstream of the draw-off line, a distance sufficient to allow compression of the pig to a diameter small enough to allow free flow of fluid around the basket and into the draw-off line. The frustoconical shape is particularly suitable for catching the foamed plastic pigs since stream pressure of the flowing fluid will force the compressible pig to conform to the conical shape of the basket, thereby assuring the free flow of liquid through the basket wall upstream of the trapped pig and out through the draw-off line.

The pig trap may be opened by diverting the stream through a bypass line, thus isolating the pig trap. The pig may then be removed within the basket and is suitably recovered by means of a pusher which is provided for that purpose.

The present invention may be more clearly understood by reference to the drawings wherein:

FIG. 1 is a sectional view of the pig basket of the present invention positioned within a conventional pig trap;

FIG. 2 is a detailed drawing of the receiving basket of the present invention;

FIG. 3 is a sectional view of the pig basket of the present invention taken along the section 3—3 of FIG. 2;

FIG. 4 is a sectional view taken along the line 4—4 of FIG. 2;

FIG. 5 is a fragmentary sectional view showing the construction of the sheet metal ring which is formed on the larger end of the receiving basket and its connection to the wire basket; and FIGS. 6 and 7 are sectional views of modified receiving baskets.

Turning now to FIG. 1, a pig trap 100 is seen to be provided with a reducing means 101 which connects the pig trap with the pipeline 102, and with a draw-off line 103 for withdrawing the fluid from the pig trap. The receiving basket 110 of the present invention is shown to be positioned within the pig trap 100 so that the larger end 112 of the receiving basket is positioned upstream of the draw-off line 103. The basket is shown to be kept in an axially aligned position by means of supports 114, positioning rod 116, and aligning fins 118, the positioning rod 116 being provided also with a stop 120. Access to the pig trap and receiving basket is accomplished by means of the dish-shaped closure head 122 which is suitably attached to the pig trap by a plurality of bolts.

Referring now to FIGS. 2, 3, and 4, wherein like numerals are used to indicate the same parts as in FIG. 1, the basket of the present invention is seen to comprise a frustoconical foraminous body 124 which may be formed of screen or of perforated sheet metal. This body is seen to comprise a larger end 112 and a smaller end 126. The smaller end is from about one-half to three-fourths the diameter of the larger. The smaller end 126 is provided with a central access slot 128 through which is passed a positioning rod 116. Attached here and depending from the body 124 are a plurality of supports 114 which are shown to conform to the angle of the cone so as to provide means for supporting the cone rigidly within the cylindrical pig trap. The body is preferably from three and one-half to five times as long as the diameter of the larger end.

The positioning rod assembly, as clearly shown in FIG. 2, is shown also to include a pad 130 attached rigidly to the end of the positioning rod 116 which is contained within the body of the basket 124. The positioning rod 116 is also provided with a short lug 132 which is preferably welded to the positioning rod immediately adjacent to the end plate 126. On the opposite end of the positioning rod the stop 120 is attached, which rests against the dished head of the pig trap in order to maintain the frustoconical receiving basket in the correct position. Also provided are aligning fins 118 for maintaining the positioning rod 116 substantially coaxial with the pig trap.

Referring to FIG. 3, the positioning of the supporting members 114 is clearly shown; although shown as being positioned at 90° angles, it is obvious that the number of supporting members 114 may be varied so as to provide three members at 120° intervals, etc.

Referring again to FIG. 3, the configuration of the end plate 126 may be seen as containing a central passage 128 and a lug slot 134, which is used as hereinafter set forth.

Referring now to FIG. 5, the ring which encloses the larger end of the frustoconical basket is seen to be made of sheet metal which has an inner surface 140 and an outer surface 142, with a leading edge 144 slightly slanted in order to encourage deformation of the deformable pig. The trailing edge 146 is crimped into contact with the screen, and may be tack welded thereto, as indicated at 148. Likewise, the outside wall 142 may be tack welded to the basket as shown at 150.

Thus it is seen that a receiving basket of great utility is provided.

Referring now to FIG. 6, a modified basket 610 is shown, which may be substituted for the basket means 110 in FIG. 1. The construction of basket 610 is generally similar to that of the frustoconical basket 110, except that a basket is formed of a cylindrical foraminous portion 624, rather than a frustoconical foraminous portion 124 as shown in FIG. 2. The basket also includes an imperforate cylindrical portion 625 which connects the cylindrical foraminous basket with a frustoconical inlet 626. The axial dimension of cylindrical portion 625 is not critical and can be from one-fourth to two times the inside diameter of the smaller end of frustoconical inlet 626. Alternatively, the cylindrical basket 624 may be directly attached to the smaller end of cone 626 and the imperforate cylinder 625 omitted entirely. The outer diameter of the larger end of the frustoconical member 626 is substantially the same as the inside diameter of the pig trap within which the basket is to be used. The inside diameter of the cylindrical portion is preferably about the same as the inside diameter of the pipe run with which the basket is to be used, such as run 102 in FIG. 1. Positioning vanes 614 are provided to serve generally the same functions as vanes shown in FIG. 2. It will be understood that this modification is also provided with a rod such as 116, a lug such as 132, fins 118, pad 130, and stop 120.

Referring now to FIG. 7, a modification of the basket of FIG. 6 is seen as a basket receiving means 710 which is formed of rolled sheet metal such as 14 or 16 gauge, and is provided with a plurality of peripherally spaced holes 712 located about three and one-half diameters (based on the largest diameter of the frustoconical inlet) from the rear of the basket. A plurality of axially spaced holes 714 is provided in order to provide for a liquid "bleed" from the pig receiver as one or more pigs are forced into and compressed within the basket 710.

In use, a deformable pig will pass by way of the line 102 into the pig trap 100, enter into the basket, and be compressed by means of the ring 112 and of decreasing cross section of the basket body 124 to become wedged within the basket 110. Upon isolation of the pig trap from the flowing stream, the dished head 122 is removed, and the entire pig recovery assembly 110 is withdrawn from the pig trap. The lug 132 is aligned with the lug slot 134 in end plate 126, and the positioning rod 116 is pushed inwardly into the receiving basket so that the pad 130 is extended into contact with the pig, thereby pushing it out of the basket 124 through the ring 112.

Thus, the present invention comprises a simple and workable solution to the problem of recovering deformable pigs within a pipeline.

Having disclosed in detail the preferred and best embodiment of the present invention contemplated, what is intended to be covered by Letters Patent should be limited not by the specific examples hereinabove disclosed, but rather by the appended claims.

We claim:
1. A pig receiver which comprises
a frustoconical foraminous body having a larger end and a smaller end,
sheet metal ring means attached to and enclosing said body at said larger end,
end plate means depending from and extending across said body at said smaller end,
said end plate means having a concentric passage and a radial slot formed therein,
a plurality of support plates attached to and depending from said foraminous body, said support plates extending axially and radially from said body,
a positioning rod having a first end extending freely through said concentric passage and having a second end,
lug means attached to and extending normally from said positioning rod a distance less than the extent of said radial slot but greater than said concentric passage,
a plurality of radially extending aligning fins attached to said positioning rod,
pad means secured to said first end of said positioning rod,
and stop means secured to said second end of said positioning rod.

2. Apparatus in accordance with claim 1 wherein said smaller end is from one-half to three-fourths the diameter of said larger end and said body is from three and one-half to five times as long as said diameter of the larger end.

3. A pig receiver which comprises
a frustoconical foraminous body having a larger end and a smaller end,
end plate means depending from and extending across said body at said smaller end,
said end plate means having a concentric passage and a radial slot formed therein,
a positioning rod having a first end extending freely through said concentric passage and having a second end,
pad means secured to said first end of said positioning rod,
and positioning means for supporting said body and said rod within a pig trap.

4. Apparatus in accordance with claim 3 wherein said positioning means include support plates extending axially and radially from said body and radially extending aligning fins attached to said positioning rod.

5. In combination with a pig trap comprising an enlarged portion of a pipeline and having a draw-off pipe and dished head means, a pig receiver which comprises
a frustoconical foraminous body having a larger end and a smaller end,
sheet metal ring means attached to and enclosing said body at said larger end,
end plate means depending from and extending across said body at said smaller end,
said end plate means having a concentric passage and a radial slot formed therein,
a plurality of support plates attached to and depending from said foraminous body, said support plates extending axially and radially from said body,
a positioning rod having a first end extending freely through said concentric passage and having a second end,
lug means attached to and extending normally from said positioning rod a distance less than the extent of said radial slot but greater than said concentric passage,
a plurality of radially extending aligning fins attached to said positioning rod,
pad means secured to said first end of said positioning rod, and stop means secured to said second end of said positioning rod.

6. Apparatus in accordance with claim 5 wherein said smaller end is from one-half to three-fourths the diameter of said larger end and said body is from three and one-half to five times as long as said diameter of the larger end.

7. A pig receiver which comprises
a frustoconical foraminous body having a larger end and a smaller end,
means substantially enclosing the smaller end of said body and having a passage therethrough,
and means extending through said passage and into said body for ejecting pigs therefrom, wherein said ejecting means comprises a positioning rod, pad means attached to one end of said positioning rod, and means for aligning said positioning rod within a cylindrical body having the same external diameter as said larger end.

8. Apparatus in accordance with claim 7 wherein said smaller end is from one-half to three-fourths the diameter of the larger end and said body is from three and one-half to five times as long as said diameter of the larger end.

9. A pig receiver which comprises
a frustoconical imperforate inlet portion having a larger end and a smaller end,
cylindrical foraminous basket means attached to and depending from said smaller end,
end plate means depending from and extending across said foraminous basket means at the end remote from said smaller end,
said end plate means having a concentric passage and a radial slot formed therein,
a plurality of support plates attached to and depending from said foraminous body, said support plates extending axially and radially from said body,
a positioning rod having a first end extending freely through said concentric passage and a second end,
lug means attached to and extending normally from said positioning rod at a distance less than the extent of said radial slot but greater than said concentric passage,
a plurality of radially extending aligning fins attached to said positioning rod,
pad means secured to said first end of said positioning rod,
and stop means secured to said second end of said positioning rod.

10. Apparatus in accordance with claim 9 wherein said foraminous basket means comprises an imperforate sheet metal body having peripherally spaced holes located from three and one-half to five times diameters based on said larger end from the end of said basket remote from the frustoconical inlet portion, and includes a plurality of axially spaced passages located between said peripherally spaced holes in said remote end.

11. A pig receiver which comprises
a frustoconical imperforate inlet portion having a larger end and a smaller end,
rylindrical foraminous basket means attached to and depending from said smaller end,
end plate means depending from and extending across said foraminous basket means at the end remote from said smaller end,
said end plate means having a concentric passage and radial slot formed therein,
a positioning rod having a first end extending freely through said concentric passage and a second end,
pad means secured to said first end of said positioning rod,
and means for positioning said receiver concentrically within a pig trap.

12. Apparatus in accordance with claim 11 wherein said positioning means include a plurality of support plates attached to and extending axially and radially from said body, and aligning fins attached to said positioning rod.

References Cited by the Examiner

UNITED STATES PATENTS

| | | | |
|---|---|---|---|
| 584,195 | 6/1897 | Robinson et al. | 210—415 |
| 646,464 | 4/1900 | Schutte | 210—452 |
| 1,691,867 | 11/1928 | Burns | 210—413 X |
| 2,162,043 | 6/1939 | Westlund et al. | 210—452 X |
| 2,669,936 | 2/1954 | Elkins et al. | |
| 2,876,842 | 3/1959 | McSpadden. | |
| 3,100,308 | 8/1963 | De Sena. | |
| 3,171,148 | 3/1965 | Osborn et al. | |
| 3,199,441 | 8/1965 | Haug | 210—415 X |
| 3,232,436 | 2/1966 | Nilsson | 210—415 X |

FOREIGN PATENTS 654,295  11/1928  France.

REUBEN FRIEDMAN, *Primary Examiner.*

D. M. RIESS, *Assistant Examiner.*